(12) United States Patent
Rajasekaran et al.

(10) Patent No.: US 9,494,206 B2
(45) Date of Patent: Nov. 15, 2016

(54) VIBRATION DAMPING (71) Applicant: ROLLS-ROYCE PLC, London (GB)

(72) Inventors: Ramesh Rajasekaran, Derby (GB);
Marc-Antoine Boucher, Exeter (GB);
Chrisopher W. Smith, Exeter (GB);
Fabrizio Scarpa, Bristol (GB);
Kenneth E. Evans, Exeter (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 13/800,792

(22) Filed: Mar. 13, 2013

(65) Prior Publication Data
US 2013/0264757 A1 Oct. 10, 2013

(30) Foreign Application Priority Data

Apr. 4, 2012 (GB) .................................. 1206025.7

(51) Int. Cl.
*F16F 7/00* (2006.01)
*F16F 3/093* (2006.01)
(52) U.S. Cl.
CPC ................ *F16F 7/00* (2013.01); *F16F 3/093* (2013.01); *F16F 2224/0225* (2013.01); *Y10T 156/10* (2015.01)
(58) Field of Classification Search
CPC .... F16F 7/00; F16F 3/093; F16F 2224/0225; Y10T 156/10
USPC .......... 188/381, 268; 244/218, 219; 428/116–118; 267/141
See application file for complete search history.

(56) References Cited

U.S. PATENT DOCUMENTS

| | | | |
|---|---|---|---|
| 4,038,040 A * | 7/1977 | Nagl | 428/596 |
| 4,786,343 A | 11/1988 | Hertzberg | |
| 4,899,323 A * | 2/1990 | Fukahori et al. | 367/176 |
| 5,862,975 A | 1/1999 | Childress | |
| 6,274,216 B1 * | 8/2001 | Gonidec et al. | 428/116 |
| 6,644,599 B2 * | 11/2003 | Perez | 244/219 |
| 7,055,782 B2 * | 6/2006 | Dittrich | B64C 13/40 244/123.11 |
| 7,195,210 B2 * | 3/2007 | Hamilton et al. | 244/219 |
| 7,541,084 B2 * | 6/2009 | Halahmi et al. | 428/174 |
| 7,896,294 B2 * | 3/2011 | Dittrich | 244/219 |
| 7,931,240 B2 * | 4/2011 | Kothera et al. | 244/218 |

(Continued)

FOREIGN PATENT DOCUMENTS

| | | |
|---|---|---|
| EP | 1 548 229 A2 | 6/2005 |
| EP | 2 187 001 A1 | 5/2010 |
| WO | WO 2011/104112 A1 | 9/2011 |

OTHER PUBLICATIONS

Search Report issued in British Patent Application No. GB1206025.7 dated Jul. 1, 2012.

*Primary Examiner* — Thomas Irvin
(74) *Attorney, Agent, or Firm* — Oliff PLC (57) ABSTRACT

A vibration damping insert configured to seat within a cell of a cellular structure and to span the cell cavity. The insert comprises a first portion formed of a first material and a second portion formed of a second material having lower stiffness than the first material. The first portion is arranged to constrain deformation of the second portion to be in a predetermined direction. The invention also comprises a vibration damping body comprising a cellular structure formed of a plurality of tessellating cells and a vibration damping insert as described. The vibration damping insert is mounted in at least one of the cells in the cellular structure. The invention also comprises a method of manufacturing a vibration damping body.

18 Claims, 6 Drawing Sheets

(56) References Cited

U.S. PATENT DOCUMENTS

| | | | |
|---|---|---|---|
| 8,186,631 B2* | 5/2012 | Iannucci | 244/219 |
| 8,426,010 B2* | 4/2013 | Stadthagen-Gonzalez | 428/178 |
| 8,807,307 B2* | 8/2014 | Choi | 188/381 |
| 2004/0069907 A1* | 4/2004 | Dockter | B64C 3/46 244/218 |
| 2005/0029406 A1* | 2/2005 | Dittrich | B64C 13/40 244/221 |
| 2005/0056731 A1* | 3/2005 | Hamilton | B64C 3/30 244/219 |
| 2006/0129227 A1* | 6/2006 | Hengelmolen | 623/1.16 |
| 2006/0286342 A1* | 12/2006 | Elzey | 428/131 |
| 2008/0226870 A1 | 9/2008 | Sypeck et al. | |
| 2011/0001018 A1* | 1/2011 | Hamilton | B64C 3/38 244/35 R |
| 2011/0038727 A1 | 2/2011 | Vos et al. | |
| 2011/0189440 A1 | 8/2011 | Appleby et al. | |
| 2011/0240194 A1 | 10/2011 | Summers et al. | |
| 2012/0315456 A1* | 12/2012 | Scarpa et al. | 428/221 |
| 2014/0001310 A1* | 1/2014 | White | 244/117 R |

* cited by examiner

VIBRATION DAMPING

The present invention relates to vibration damping structures and more particularly to vibration damping inserts for cellular materials which may be used, for example, as vibration damping materials within components or other structures comprising metals or composites.

Figure 1:
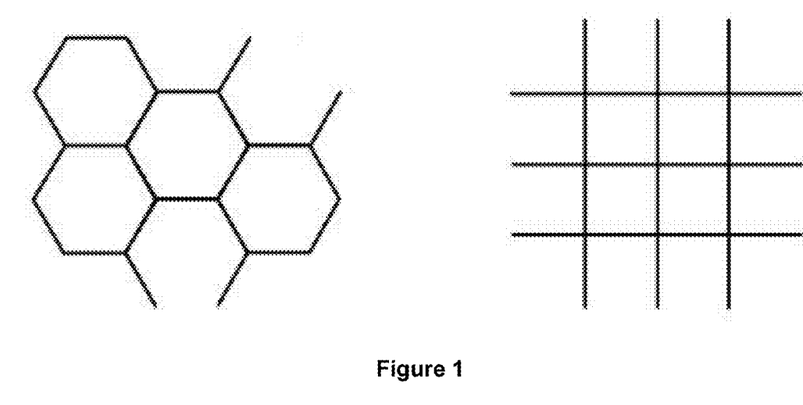
FIG. 1 shows known cross-sections of cellular structures.

Cellular structures are used in a variety of engineering applications and conventional honeycomb cell structures have become widely used for their strength to weight characteristics. Examples of typical geometries of conventional cellular structures which have been used as cores in sandwich panels within, for example, the aerospace and marine industries are shown in FIG. 1.

Conventional materials for formation of the cell structure include aluminium, Nomex® (aramid), Kevlar®, and other common thermoplastic polymers. Such structures can be considered to be 'monolithic' honeycombs since there is only one significant phase present, plus air.

The primary function of materials chosen for use as sandwich panel cores is to maintain a separation between opposing skins. Such materials are generally relatively stiff and display low loss coefficients. The ability of these monolithic honeycombs to absorb vibration energy, is dependent primarily upon the constituent material's inherent damping or loss coefficient and not upon geometrical properties of the structure. Thus the ability of such structures to benefit the damping behaviour of the structure is limited.

Furthermore, alternative materials which are known to have higher loss coefficients, and thus better damping, generally display lower stiffness characteristics and are unsuitable for use as structural components such as honeycomb cores. The unavoidable trade off between these two properties further compounds the above problem.

WO2011/104112 discloses a cellular structure having either elastomer fillets at the vertices of cells or elastomer interlayers between the walls of adjacent cells to improve the vibration damping.

It is an aim of the present invention to provide a vibration damping insert configured for cellular structures offering improved vibration damping properties.

According to a first aspect of the present invention there is provided a vibration damping insert configured to seat within a cell of a cellular structure and to span a cell cavity of the cell, the insert comprising: a first portion formed of a first material; and a second portion formed of a second material having lower stiffness than the first material; wherein the first portion is arranged to constrain deformation of the second portion to be in a predetermined direction.

Advantageously, the second material provides vibration damping and the first material directs the effect to improve the vibration damping performance of the insert.

Each cell may define a void therein, which may be gas filled, for example with air.

The first material may comprise a polymer. The first material may comprise the material forming the cellular structure or may comprise a different material. The second material may comprise an elastomer, which may be a viscoelastic. The location of the second material can be chosen so that it is excited to a greater or lesser extent according to the vibration modes present in service. The second material has a higher intrinsic loss, and thus better damping, than the first material. The cellular structure may take the form of a so-called honeycomb structure.

The predetermined direction may be aligned with a direction of shear stress or strain or with a direction of compression. There may be more than one predetermined direction.

The first and second portions may form a shear-lap arrangement or a compression-lap arrangement.

The cell may comprise a regular polygon; the cell may comprise a regular hexagon or a regular re-entrant polygon. The cell may be auxetic.

The present invention also provides a vibration damping body comprising a cellular structure formed of a plurality of tessellating cells, the body further comprising a vibration damping insert as described above, the vibration damping insert being mounted in at least one of the cells in the cellular structure.

Advantageously the vibration damping body may be used as part or all of a component in a structure requiring vibration damped. For example, the vibration damping body may comprise an aerofoil for a gas turbine engine, or may comprise the core thereof.

The vibration damping insert may be mounted in each cell in the cellular structure or only in selected cells. The vibration damping insert in one cell may be aligned in a different direction to the vibration damping insert in another cell of the cellular structure.

The present invention also provides a gas turbine engine comprising the vibration damping body described, and a gas turbine engine comprising the vibration damping insert described.

The present invention also provides methods of manufacturing the vibration damping body comprising co-forming the cellular structure and the vibration damping insert; or bonding the vibration damping insert within a cell cavity of a cell of the cellular structure. The methods of manufacturing may also comprise moulding the first or second portions of the vibration damping insert.

Embodiments of the present invention are described in further detail below by way of example with reference to the accompanying drawings, of which.

The present invention relates generally to insertion of a vibration damping insert into a cellular structure, such as an auxetic honeycomb, to assist in absorption of vibrational energy. There are many industrial machinery applications in which the present invention may be advantageous, such as for example, gas turbine engines, industrial pumping equipment, power generation equipment and/or other types of propulsion equipment for use in aerospace, marine or land-based craft.

Whilst the embodiments of the present invention described below focus on the use of vibration damping for blades, such as fan blades of a gas turbine engine, the skilled person will appreciate that the present invention may find application in any circumstances where conventional cellular materials have previously been proposed or adopted. It is to be noted that a majority of such applications currently under consideration involve provision of a cellular material as a filler between opposing walls of a larger component or structure.

Figure 2:
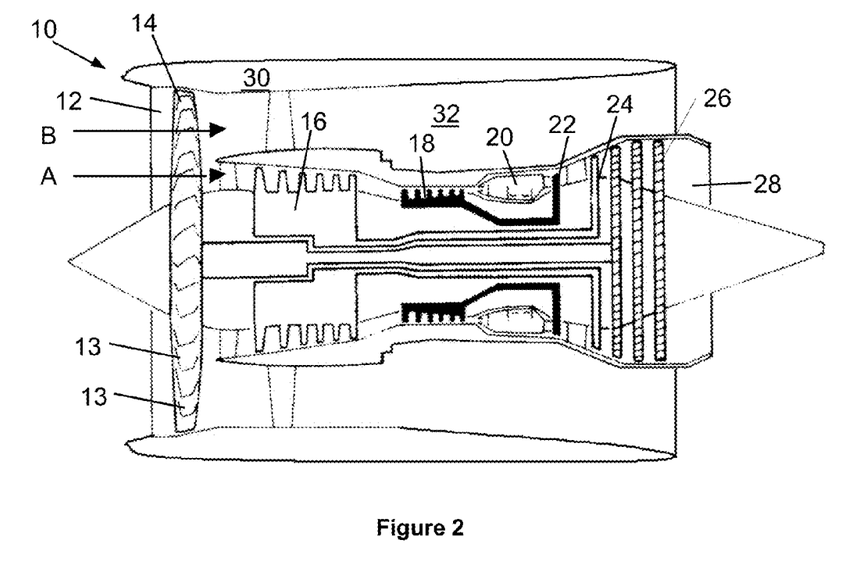
FIG. 2 is a sectional side view of a gas turbine engine in which the present invention may be used.

A gas turbine engine 10 is shown in FIG. 2 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 3:
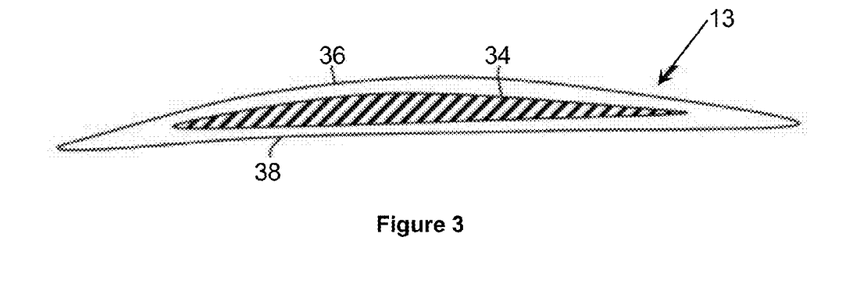
FIG. 3 shows a cross section of a blade comprising vibration damping according to the present invention.

The fan 14 comprises an array of fan blades 13. A cross-section of one of the fan blades 13 comprising a vibration damping body 34 according to one aspect of the present invention is shown in FIG. 3. It can be seen that opposing walls 36 and 38 of the fan blade 13 provide the gas washed surfaces in use and define there-between an internal cavity, in which the vibration damping body 34 is located. During operation, the rotation of the fan 14, compressors 16, 18 and turbines 22, 24, 26 within the engine 10 causes unwanted vibration. If unchecked, such vibrations can significantly reduce the performance of the engine 10 and the life of components therein. Accordingly the vibration damping body 34 is proposed to improve vibration damping properties of the blades 13.

Figure 4:
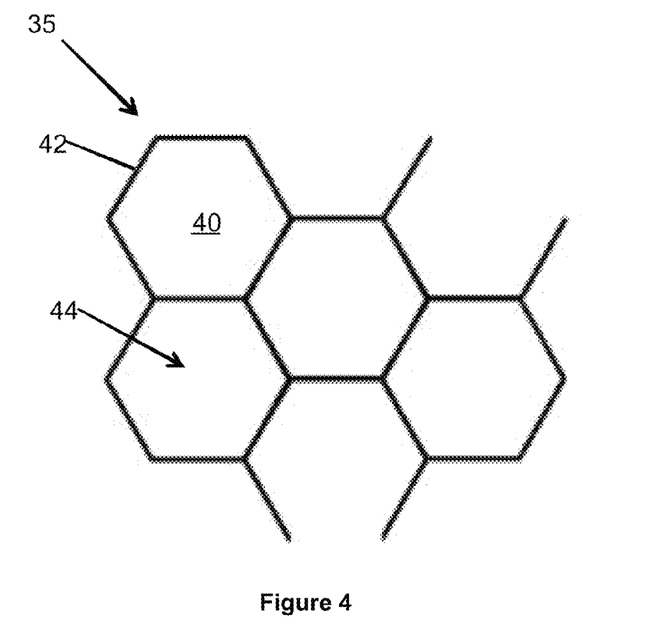
FIG. 4 shows a hexagonal cellular structure forming a vibration damping body according to aspects of the present invention.

The vibration damping body 34 comprises a cellular structure 35 which is formed of a plurality of tessellating cells 40, an embodiment of which is shown in FIG. 4. Each cell 40 is defined by cell walls 42 and defines a substantially air-filled cavity 44. Alternatively the cell cavity 44 may be filled or partially filled with a different fluid. In the illustrated embodiment, each cell 40 is hexagonal. Alternatively, each cell 40 could be any regular polygon, such as octagonal or square. The cellular structure 35 has depth so that additional cell walls 42 extend perpendicularly to the plane of the polygon. Thus each cell 40 is a prism of constant cross section.

Figure 5:
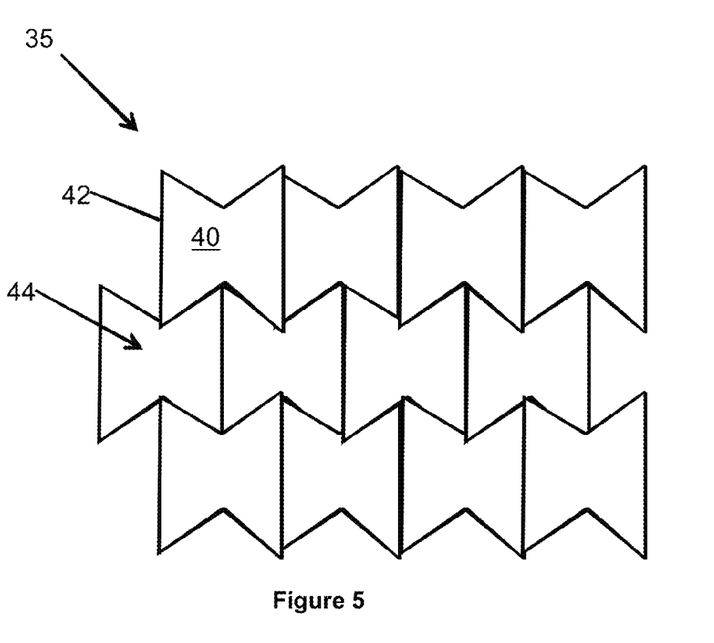
FIG. 5 shows a re-entrant hexagonal cellular structure forming a vibration damping body according to aspects of the present invention.

Each cell 40 could alternatively have a regular re-entrant polygon shape, such as a regular re-entrant hexagon as shown in FIG. 5. Such a re-entrant shape allows for lateral expansion in tension and so is auxetic. An auxetic cell arrangement may also be described as 'dilational' or as having a negative Poisson's ratio. Poisson's ratio is defined as the negative of the transverse strain divided by the longitudinal strain. Accordingly, applying a unidirectional tensile force to auxetic material results in an increase in size in the transverse dimension.

The vibration damping body 34 further comprises a vibration damping insert 46. The present invention also comprises a vibration damping insert 46 configured to seat within a cell 40 of a cellular structure 35 and to span the cell cavity 44.

Figure 6:
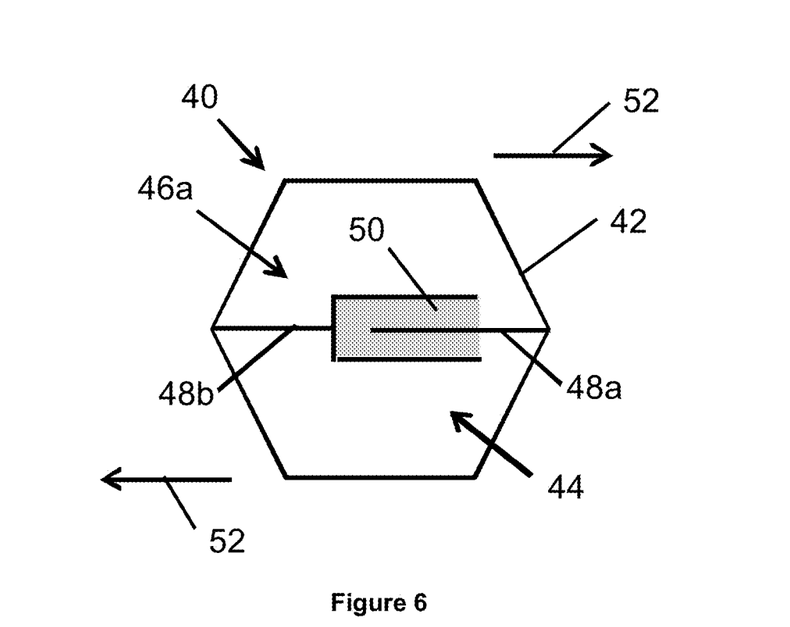
FIG. 6 shows a hexagonal cell with a vibration damping insert according to the present invention.

An embodiment of the vibration damping insert 46 is shown in FIG. 6 and comprises two portions. The first portion 48 is formed of a first material and the second portion 50 is formed of a second material. The first portion 48 itself comprises a first part 48a and a second part 48b. In other embodiments of the vibration damping insert 46 the first portion 48 comprises more than two parts 48a, 48b as will be described below. The second material has a lower stiffness than the first material.

In one application of the vibration damping insert 46 of the present invention the first material comprises a polymer and the second material comprises an elastomer such as silicone rubber, polybutadiene and/or natural rubber. More generally, an elastomer having a high intrinsic tangent loss coefficient may be used. It is found to be of benefit if a material displaying viscoelastic properties is used. The first material may be the same material as the cell walls 42 forming the cellular structure 35 of the vibration damping body 34. The key property of the second material is that it displays lower stiffness than that of the first material. Thus the elastomer material in the honeycomb absorbs vibrational energy. This allows honeycombs to exhibit significantly larger vibration damping (or loss coefficients) for minimal weight penalties, more so than in existing competitor technologies.

The vibration damping insert 46 is configured to span the cell cavity 44 and is initially described in two dimensions in the plane of the tessellating polygons. Preferably the first portion 48 seats within the cell 40 at two of the vertices of the cell 40. To effectively damp most vibration modes the vertices should be diametrically opposite, but the skilled reader will understand that a different pair of vertices may be chosen in other arrangements. Similarly, for some cell 40 shapes there may not be opposite vertices, in which case the vibration damping insert 46 may be configured to seat against one or more cell walls 42 and be coupled thereto in a suitable manner.

In the embodiment illustrated in FIG. 6 the first portion 48 of the vibration damping insert 46 is seated in diametrically opposed vertices of a hexagonal cell 40. Other cells 40 of the cellular structure 35 are not illustrated in this figure for clarity only. The vibration damping insert 46 takes the form of a so-called shear-lap insert 46a. The first part 48a of the first portion 48 extends from one of the cell vertices towards the other cell vertex and is straight. The second part 48b of the first portion 48 is U-shaped or cup-shaped with a rod part coupled between the closed end of the U-shape and the second cell vertex. The rod part is optional; instead the U-shaped part may be configured to abut the cell vertex directly. The second part 48b is arranged to surround the free end of the first part 48a so that the first portion 48 resembles a piston. The second part 48b does not touch the first part 48a in normal use.

The second portion 50 of the vibration damping insert 46 is arranged to substantially fill the cavity within the U-shaped part of the second part 48b of the first portion 48. When the cell 40 is subject to stress or strain the second portion 50 of the vibration damping insert 46 deforms more readily than the first portion 48 due to the different stiffnesses. The first portion 48 acts to constrain the deformation of the second portion 50 to be in a predetermined direction which thereby improves the vibration damping capacity of the vibration damping insert 46. The maximum vibration damping is achieved when the vibration damping insert 46 is aligned with the principal direction of the stress or strain experienced by the cell 40. Thus in the illustrated embodiment, the vibration damping insert 46 is aligned with a direction of shear stress or strain applied to the cell 40 which is horizontally across the page as illustrated by shear stress or strain arrows 52.

In applications where the cell 40 is subject to a different type of strain, for example compression strain, a different arrangement of vibration damping insert 46 is required. Similarly, if the cell 40 is subjected to strains in more than one direction a different arrangement of vibration damping insert 46 is more effective. Various alternative embodiments of vibration damping insert 46 will now be described.

Figure 7:
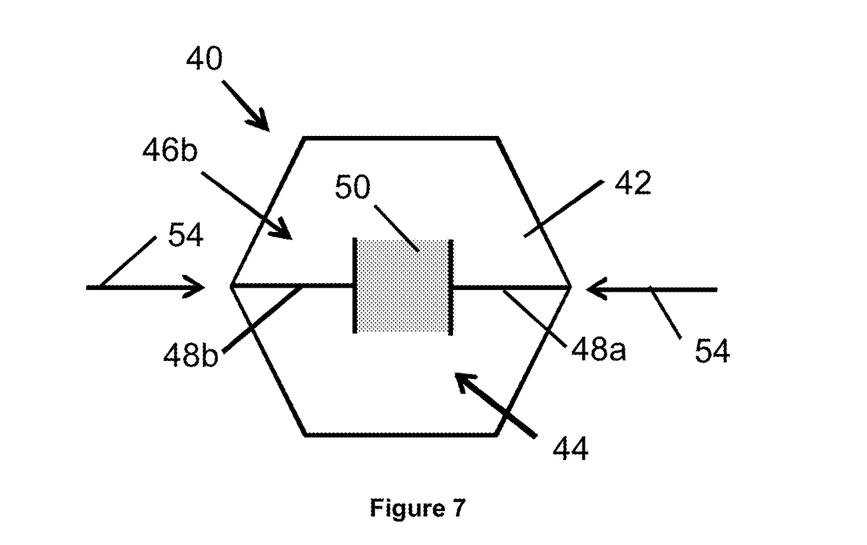
FIG. 7 shows a hexagonal cell with another vibration damping insert according to the present invention.

FIG. 7 shows an alternative arrangement of the vibration damping insert 46 of the present invention, a so-called compression-lap insert 46b, which is configured to effectively damp compression strains. The compression strain is applied to the cell 40 horizontally across the page as illustrated by compression strain arrows 54. The vibration damping insert 46 comprises the first portion 48 and the second portion 50 as in the shear-lap insert 46a. In the compression-lap insert 46b the first portion comprises first and second parts 48a, 48b which are mirror images of each other. Each of the first and second parts 48a, 48b comprises a first rod extending from one vertex of the cell 40 towards the other vertex and a second rod arranged perpendicularly thereto and coupled at its centre to the free end of the first rod to form a T-shape. The second rods of the first and second parts 48a, 48b are parallel to each other and spaced apart. The second portion 50 of the vibration damping insert 46 is arranged between the second rods of the first portion 48 so that its deformation is constrained by the first portion 48.

Figure 8:
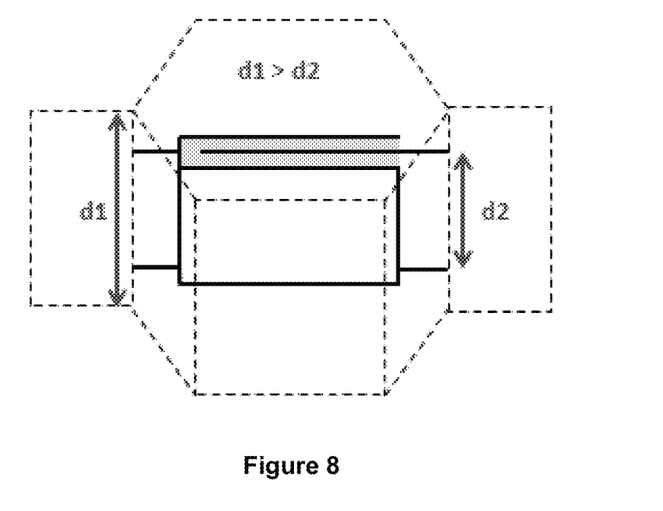
FIG. 8 shows a perspective view of a hexagonal with a vibration damping insert according to the present invention.

In order to effectively damp in-plane vibration strains it is beneficial for the vibration damping insert 46 to extend with constant cross-sectional shape for the full depth of the cell 40. To damp out of plane vibration strains it may be more beneficial for the vibration damping insert 46 to extend over less than the full depth of the cell 40. In particular, for out of plane shear strains the shear-lap insert 46a may be configured such that it has a smaller depth than the cell walls 42. The shear-lap insert 46a may be centred vertically. This is illustrated in FIG. 8. Alternatively, the first part 48a of the first portion 48 may extend from the base of the cell vertex upwards and the second part 48b of the first portion 48 may extend from the top of the opposite cell vertex downwards, with the second portion 50 filling the cavity of the second part 48b.

Figure 9:
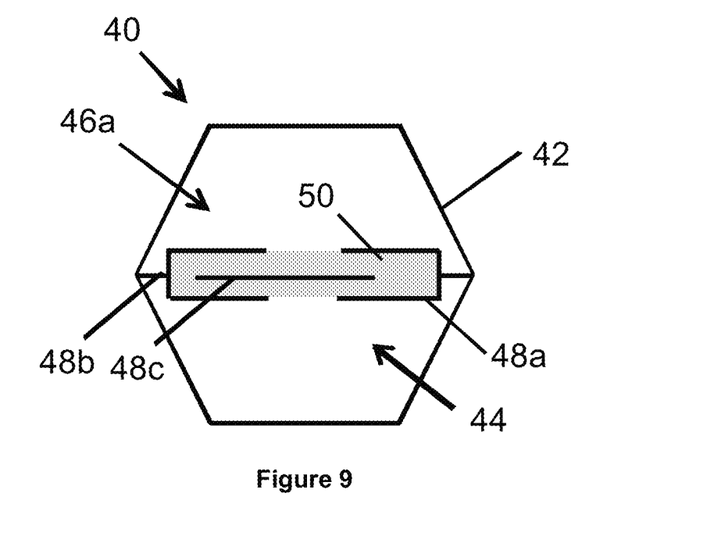
FIGS. 9 to 12 show hexagonal cells with alternative vibration damping inserts according to the present invention.
Figure 10:
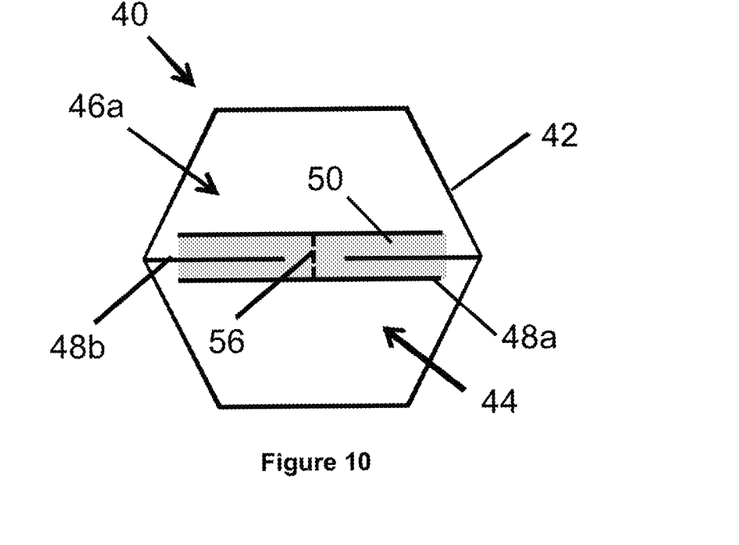

Further embodiments of the vibration damping insert 46 of the present invention are shown in FIGS. 9 to 12. In these embodiments the first portions 48 comprise more than two parts. In particular further shear-lap inserts 46a are illustrated which are symmetrical in one or more plane perpendicular to the plane of the hexagon. FIGS. 9 and 10 each illustrate shear-lap inserts 46a with an additional degree of symmetry relative to the embodiment illustrated in FIG. 6; that is they are each symmetric about a plane forming the locus between the vertices from which the first portion 48 of the vibration damping insert 46 extends.

Figure 11:
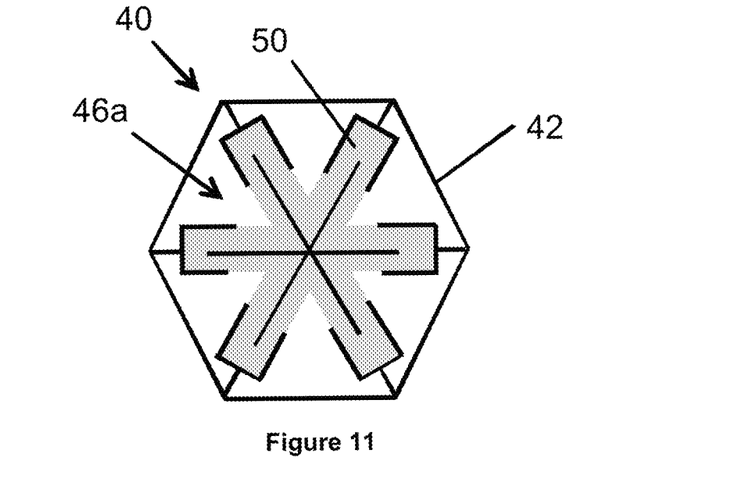
Figure 12:
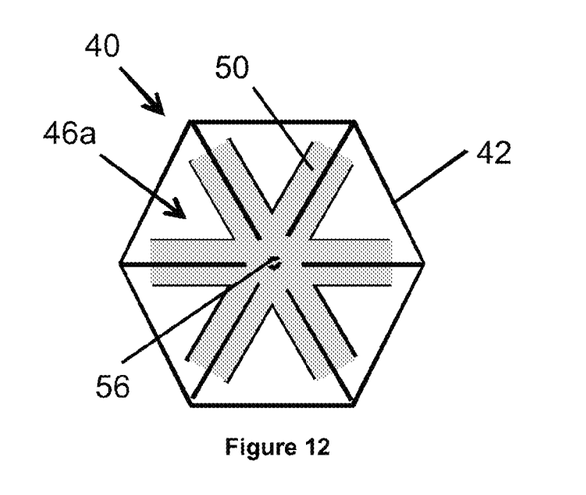

FIGS. 11 and 12 each illustrate shear-lap inserts 46a with two additional degrees of symmetry relative to the embodiments illustrated in FIGS. 9 and 10; that is they are each symmetric about every plane forming a locus between opposed vertices of the cell 40 and comprise multiple first portions 48 of the vibration damping insert 46 extending from each vertex. These vibration damping inserts 46a are multi-ended shear-lap inserts 46a.

Beneficially there is a permeable wall 56 of the first material forming the closed end of the U-shaped parts of the first portion 48 of the vibration damping insert 46 in FIG. 10 and FIG. 12. This means that the second portion 50 can permeate from one cavity to another, or to several others, formed by the first portion 48 when the vibration damping insert 46 is subjected to the strain experienced by the cell 40.

Each vibration damping insert 46 may be seated within an auxetic cell 40. Such a cell 40 may be a regular re-entrant polygon, such as a re-entrant hexagon. Any embodiment of the vibration damping insert 46 discussed above may be seated within the cell 40 to span the cell cavity 44 between opposed vertices or cell walls 42.

A vibration damping body 34 according to the present invention comprises at least one vibration damping insert 46 mounted in a cell 40 of the cellular structure 35. In one example, there is a vibration damping insert 46 mounted in each cell 40 of the cellular structure 35 to form the vibration damping body 34. In another example, there is a vibration damping insert 46 mounted in at least one but not all of the cells 40 forming the cellular structure 35. The vibration damping body 34 may comprise additional components than the cellular structure 35 and one or more vibration damping inserts 46. The vibration damping inserts 46 mounted within cells 40 of the cellular structure 35 need not be aligned with each other. Thus strains in different directions may be damped by different vibration damping inserts 46 within a vibration damping body 34.

The vibration damping body 34 may include skins or panels that close the planar faces of the cells 40. For example, the vibration damping body 34 may be an aerofoil, such as a fan blade 13, having the cellular structure 35 spanning the internal cavity between the gas-washed surfaces of the aerofoil.

Another aspect of the present invention comprises a gas turbine engine 10 comprising the vibration damping insert 46 as described in any of the embodiments. A further aspect comprises a gas turbine engine 10 comprising a vibration damping body 34 as described.

There are various methods of manufacturing a vibration damping body 34 according to the present invention. The vibration damping body 34 may be formed by co-forming, for example by extrusion, the cellular structure 35 and the vibration damping insert 46. The vibration damping insert 46 may be formed by moulding.

The basic form of a thermoplastic or thermoset cellular structure 35 may be made via standard commercial processes such as injection moulding or extrusion. The vibration damping insert 46 can be added into the cellular structure 46 via an additional step in either of these processes as will be understood by the skilled person using existing techniques. Such techniques may include so-called two-shot or multiple-shot injection moulding in which two or more different polymers are used to create a single conjoined structure in single or multiple moulding cycles. In extrusion techniques, a plurality of dyes may be used to produce the different material parts of the structure, such as by co-extrusion. The same techniques can be used for cellular structures 35 formed of metals and alloys.

Figure 13:
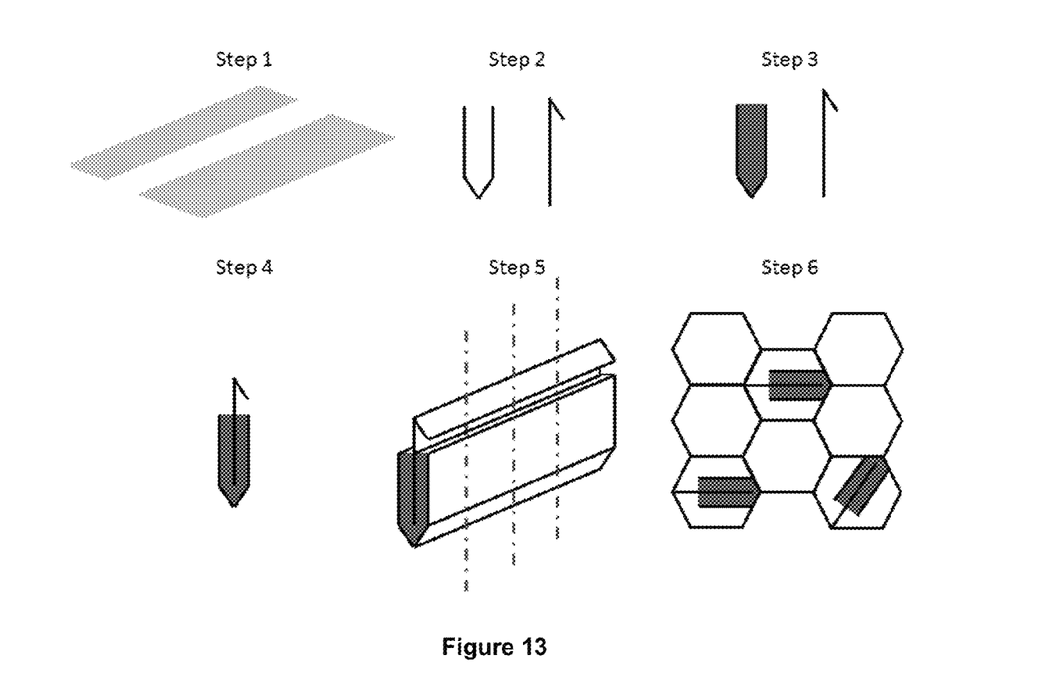
FIG. 13 shows one method of manufacturing a vibration damping body according to the present invention.

Alternatively, the vibration damping body 34 may be formed by bonding the vibration damping insert 46 within a cell 40 of the cellular structure 35. This is illustrated in the method steps of FIG. 13. Sheets of the first material are taken in step one and formed into the first and second parts 48a, 48b of the first portion 48 in step two. The second part 48b is filled with the second material to form the second portion in step three and then the first part 48a of the first portion 48 inserted into the second portion 50 in step four. This assembly is then cut into suitable lengths to fit in the cells 40 at step five before being bonded or otherwise mounted into selected ones of the cells 40 of the cellular structure 35 in step six to form the vibration damping body 34. As is apparent, not all the vibration damping inserts 46 are mounted at the same angle at step six so that vibrations in more than one direction can be damped effectively.

Since the vibration damping inserts 46 can be strongly adhered to the cellular structure 35 using any of the above-proposed techniques, they may also be more robust than competing technologies. The vibration damping insert 46 can be applied to other shape cells 40 using either manual or robotic-controlled shot injections for the second material.

Whilst specific shapes of cell 40 have been discussed and are a particular focus of the present invention, the present invention is applicable to cells 40 with a wide variety of different geometries including circular cells 40. The vibration damping benefit is realised most effectively where the vibration damping insert 46 is aligned to a direction of high strain energy dissipation (static and/or modal). Thus the insertion of vibration damping inserts 46 in three-dimensional truss structures and/or foams would also provide desirable vibration damping properties.

The vibration damping inserts 46 and vibration damping bodies 34 have significantly improved damping in comparison with polymer-only cellular structures 35. The shear-lap inserts 46a provide energy dissipation during dynamic loading by the shearing of the second portion 50 of the vibration damping insert 46. The compression-lap inserts 46b provide the energy dissipation mainly through the increased strain energy during deformation at the cell vertices.

The location of the vibration damping inserts 46 is optimal when they constrain the second material forming the second portion 50 to experience the largest deformation or highest strain energy levels. The weight increase to vibration damping (energy absorption per unit mass) improvement can be optimised using known methods such as numerical modelling. Similarly the relative stiffness of the first and second materials, and of these materials relative to the material of the cell walls 42 where this is not the same as the first material, can be optimised to improve the vibration damping of the present invention.

Any application where cellular structures 35 with large void fractions would be amenable to the use of targeted vibration damping inserts 46 such as are described above, particularly in applications where vibrations are problematic, and/or where it is important to maintain low structural weight. Despite the vibration damping insert 46 of the present invention reducing the empty space in the cell cavities 44, the void fraction of the cells 40 remains relatively high in comparison to a filled honeycomb or cellular structure 35.

Advantageously the present invention enables reduction of vibration in components, structures and assemblies. Although manufacturing is simplified if the cells 40 have constant cross-section, this is not required to obtain the advantages of the present invention.

The vibration damping insert 46 and vibration damping body 34 of the present invention may be used in any application comprising a cellular structure in which it is desirable to damp vibrations. For example, it finds utility in the aerofoils of a gas turbine engine, in a nacelle surrounding a gas turbine engine, in the pylon coupling a gas turbine engine to an aircraft, for aspects of an aircraft such as the panels, in power plants based on gas turbine engines, electrical, fossil fuels or nuclear power, and in general machinery which is subject to vibration.

The invention claimed is:

1. A cellular structure, comprising:
   a cell comprising a cell cavity defined by a perimeter wall; and
   a vibration damping insert, comprising:
      a first portion formed of a first material comprising a first portion wall distinct from the perimeter wall, the first portion wall defining an insert cavity which is entirely spaced from the perimeter wall; and
      a second portion formed of a second material having lower stiffness than the first material;
   wherein all of the second material in the cell is located within the insert cavity and the first portion is arranged to constrain deformation of the second portion to be in a predetermined direction, and
   wherein the vibration damping insert sits within the cell and spans the cell cavity of the cell.

2. The cellular structure as claimed in claim 1 wherein the first material comprises a polymer.

3. The cellular structure as claimed in claim 1 wherein the second material comprising an elastomer.

4. The cellular structure as claimed in claim 3 wherein the second material comprises a viscoelastic material.

5. The cellular structure as claimed in claim 1 wherein the predetermined direction is aligned with a direction of: shear stress, strain or compression.

6. The cellular structure as claimed in claim 1 wherein the first and second portions form a shear-lap arrangement.

7. The cellular structure as claimed in claim 6 wherein the first and second portions form a multi-ended shear-lap arrangement.

8. The cellular structure as claimed in claim 1 wherein the first and second portions form a compression-lap arrangement.

9. The cellular structure as claimed in claim 1 wherein the cell comprises a regular hexagon.

10. The cellular structure as claimed in claim 1 wherein the cell is auxetic.

11. The cellular structure as claimed in claim 1, wherein the vibration damping insert is mounted in a plurality of the cells in the cellular structure.

12. The cellular structure as claimed in claim 11 wherein a vibration damping insert is mounted in each cell in the cellular structure.

13. The cellular structure as claimed in claim 11 wherein the cellular structure comprises an aerofoil.

14. A gas turbine engine comprising the cellular structure as claimed in claim 1.

15. A method of manufacturing the cellular structure as claimed in claim 1 comprising co-forming the cellular structure and the vibration damping insert.

16. A method of manufacturing the cellular structure as claimed in claim 1 comprising bonding the vibration damping insert within a cell cavity of a cell of the cellular structure.

17. A method of manufacturing the cellular structure as claimed in claim 1 comprising molding the first or second portions of the vibration damping insert.

18. The cellular structure as claimed in claim 1 wherein the cell comprises a regular polygon.

\* \* \* \* \*